United States Patent
Karthik et al.

(10) Patent No.: US 7,634,000 B1
(45) Date of Patent: Dec. 15, 2009

(54) NOISE ESTIMATOR FOR A COMMUNICATIONS SYSTEM

(75) Inventors: Vaidyanathan Karthik, Bangalore (IN); Partha Sarathy Murali, Hyderabad (IN); Sundaram Vanka, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 596 days.

(21) Appl. No.: 11/439,000

(22) Filed: May 22, 2006

(51) Int. Cl.
*H04B 3/46* (2006.01)
(52) U.S. Cl. .................................... 375/227
(58) Field of Classification Search ................. 375/227, 375/340, 342–343, 346
See application file for complete search history.

(56) References Cited

U.S. PATENT DOCUMENTS

| 5,214,675 A | 5/1993 | Mueller et al. |
| 5,379,324 A | 1/1995 | Mueller et al. |
| 5,740,203 A | 4/1998 | Ramaswamy et al. |
| 6,792,055 B1 | 9/2004 | Hart |
| 7,161,996 B1 * | 1/2007 | Steele et al. ................. 375/347 |
| 2003/0223489 A1 * | 12/2003 | Smee et al. ................. 375/233 |

* cited by examiner

*Primary Examiner*—Khanh C Tran
(74) *Attorney, Agent, or Firm*—File-EE-Patents.com; Jay A. Chesavage

(57) ABSTRACT

A SINR estimator receiving a symbol stream has a delay element coupled to the symbol stream to produce a delayed symbol stream, which is also coupled to a conjugator. A first multiplier forms a product from the symbol stream and the output of the conjugator, thereafter summing these values over an interval L and scaling by L to form a correlated power estimate Cn. A second multiplier forms a product from the symbol stream which is multiplied by the conjugate of the input, thereafter summing these values over the preamble interval 2L and scaling by 2L to form a non-correlated power estimate Pn. Cn and Pn are compared to generate an SINR estimate.

22 Claims, 5 Drawing Sheets

Noise Estimator

Packet Detection &
Coarse Frequency Offset
Prior Art

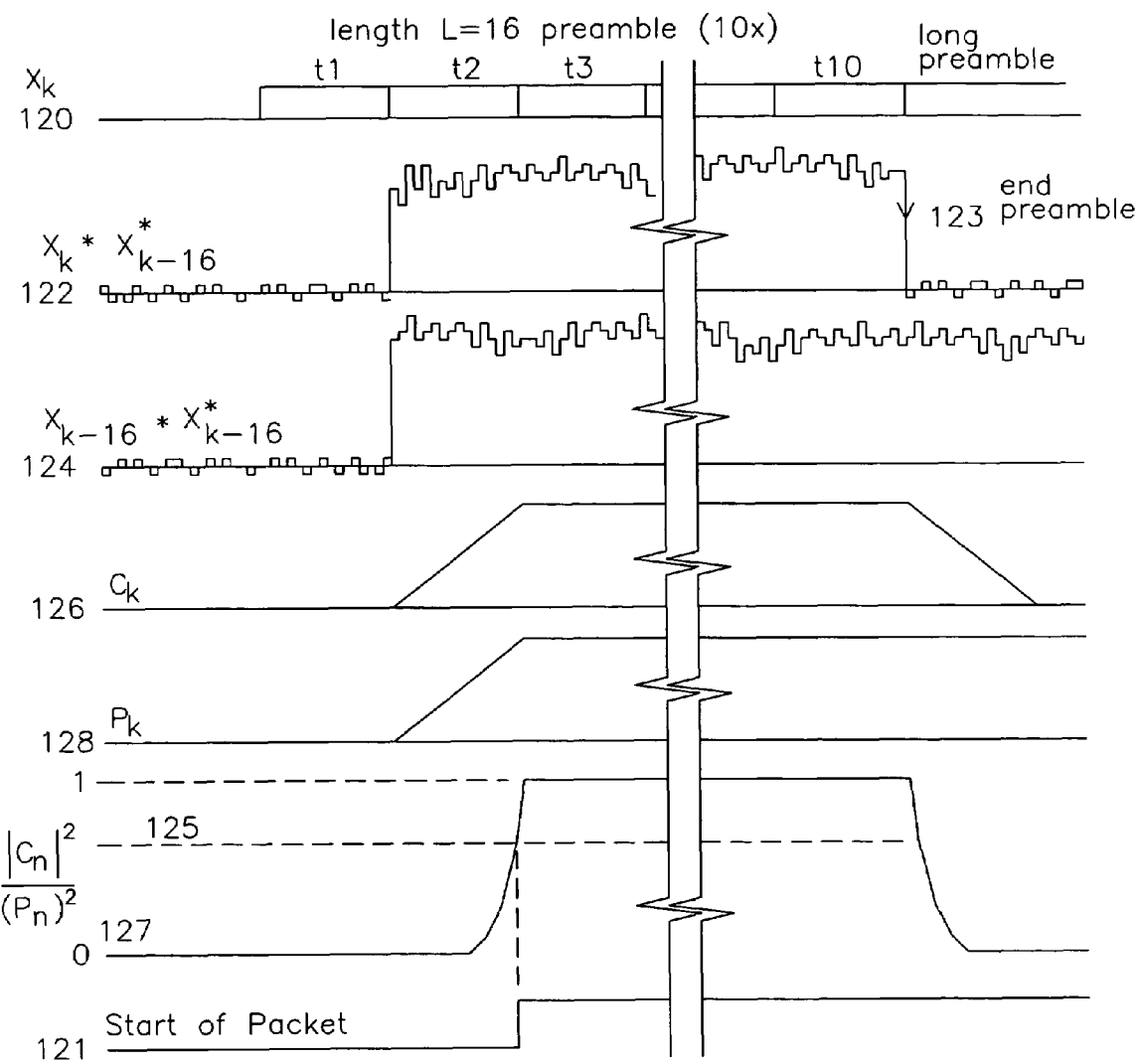

Noise Estimator

L sample Accumulator

2L Sample Accumulator

NOISE ESTIMATOR FOR A COMMUNICATIONS SYSTEM

FIELD OF THE INVENTION

The present invention is directed to the field of noise estimators, particularly as used in wireless communications system to estimate the signal quality during a preamble interval.

BACKGROUND OF THE INVENTION

FIG. 1 shows a prior art OFDM receiver 10. A baseband signal 12 enters a synchronization function 14, which serves to identify phase and frequency offsets in the incoming signal 12, where they are fed back to an NCO (not shown) or a phase rotator (not shown) which removes the offsets and frequency drifts from the synchronized signal. The phase and frequency corrected signal 15 is delivered to an FFT 16 which recovers the combinations of OFDM subcarriers which comprise the transmitted data. FFT outputs 17 are shown as signal 17a, comprising linear combinations of FFT output data having real and imaginary components. The FFT output 17 is provided to a channel estimation and equalization function 18, which produces output 19 compensated for channel phase and magnitude variations. Plot 19a shows the output 19 in a frequency vs real and imaginary amplitude view, and plot 19b shows the corresponding constellation diagram for 16-QAM, where each position in a 16 QAM constellation diagram represents 4 bits of data after decoding. The output 19 of the channel compensator 18 is fed to the soft constellation demapper 24, which performs the function of converting the constellation into corresponding data values, and this output 23 is fed to the de-interleaver and soft decoder 20, which performs data decoding resulting in output data 22.

FIG. 2 shows a preamble stream 25 for an OFDM packet. The packet 25 comprises a sequence of preamble tones P0 through P15 which form a first preamble 26 followed by a second identical preamble 28, which is followed by a third preamble 30, and finally the packet data 32. During the preamble times corresponding to preambles 26, 28, and 30 of packet 25, the synchronization function 14 and channel estimation function 18 of FIG. 1 make estimations of channel frequency offset, phase offset, and channel frequency transfer function, respectively.

FIG. 3 shows one implementation of a prior art packet detection and coarse frequency offset synchronizer such as 14 of FIG. 1. The synchronizer comprises two parts, a coarse frequency offset part 40, and a packet detection part 60. The frequency offset estimator 40 accepts as an input a stream of complex OFDM symbols 92 and a delayed version 42 of the same stream, where the delay is equal to the interval of a single preamble interval 26. The conjugator 52 has the function of inverting the imaginary part of the incoming stream such that a+jb becomes a−jb. The product of (a+jb)(a−jb) produces the signal power level $a^2+b^2$, since the same-position preamble symbols are identical other than the frequency offset generated phase shift component from the earlier symbol to the later symbol. Consequently, the multiplier 44 output contains an imaginary component corresponding to the amount of phase shift from a first preamble symbol to a second preamble symbol. The Phase Finder 46, which is implemented as a CORDIC generates an output 47 which represents the phase $\phi$ of the incoming multiplier 44 product. The frequency may be then be estimated from change of phase per sample $\Delta\phi/\Delta t$. The output of CORDIC 46 is averaged 48 to generate a coarse frequency offset 50. This value is measured during the preamble interval and fed back to a numerically controlled oscillator (NCO, not shown) or phase rotator (not shown) to remove any frequency offset during the balance of the packet receive time prior to performing the FFT, where such frequency offset would result in an offset in the FFT 16 of FIG. 1 outputs.

The symbol timing may be extracted from the processing shown as packet detection system 60 of FIG. 3. The incoming stream of baseband OFDM symbols are delayed 62 by a time equal to a preamble interval, and the preamble stream 92 is multiplied 66 by a delayed preamble 63 and conjugated 64 to produce multiplier 66 output 67. This output 67 is averaged over an interval equal to the number of symbols in a preamble (shown as 16 symbols) to generate a value Cn 74, which represents the power level of the signal, as before. During the preamble interval, the multiplication of a current preamble symbol with the same symbol from a previous preamble results in the output 67 of the multiplier 66 representing the correlated signal power. The averager 70 sums the previous preamble values (shown for a 16 symbol preamble) to generate a power value Cn 74 whose value represents the noise plus interference component of the SINR value to be determined. The output 63 of the delay element 62 is multiplied by a conjugate 64 value 65 to produce a product 69, which is averaged over the same preamble interval by averager 72 to generate a signal plus noise power level 76. Since there is very little signal correlation from one symbol of a preamble to the next, the output Pn 76 provides an indication of the uncorrelated noise plus interference level, which includes unrelated noise and interference effects such as preamplifier gain in the RF signal processing chain and reflected signal energy, in contrast to the correlated value Cn 74 indicates the correlated power level of the incoming stream during the preamble interval. Cn 74 and Pn 76 are ordinarily used to establish the symbol timing referenced to the preamble, and one such method is to divide 78 the absolute value of Cn 84 by the noise plus signal level Pn 76 to generate a figure of merit μ85, and to associate packet detection 90 with μ85 crossing some predetermined threshold using a comparator 88.

FIG. 4 shows the signals for the prior art packet detection system of FIG. 3. The packet preamble is shown as 120, while signal power 67 is shown as 122 and noise and interference power signal 69 is shown as 124. Output Cn 74 is shown as signal 126, and output Pn 76 is shown as signal 128, which both rise during second preamble time t2, which corresponds to interval 28 of FIG. 2. The ratio of Cn/Pn is shown on waveform 127, and when waveform 127 crosses threshold 125, start of packet 121 is indicated, while end of preamble/start of data/symbol timing may be detected by falling correlated signal waveform 122 edge 123.

The use of existing signals Cn and Pn is known in the prior art for symbol timing and packet detection, and it also known in the prior art to change demodulation method and transmission speed based on error rate at the detector. It is desired to generate a SINR estimate using these signals for use in demodulation, particularly following the soft constellation demapping step, whereby the quantization method performed on the demapped data may be changed in accordance with the value of SINR as determined during the preamble synchronization step.

An estimate of the receiver signal quality can be used to improve the performance or reduce the complexity of baseband processing functions. An estimate of the noise variance is a sufficient measure of the signal quality, as the AGC (Automatic Gain Control) function of the RF receiver (not shown) ensures constant input power to a base-band system. Typically, symbol decisions are compared with the received symbol to obtain an error vector. The error vectors can be averaged to obtain an estimate of the noise variance as discussed in U.S. Pat. No. 5,379,324. The symbol decisions can be made at the input to the decoder, or at the decoder output. Using decisions from the output of the decoder provides a better estimate of the noise variance. Both these techniques have significant latency, and it is useful to have an estimate of signal strength established during the preamble interval so that it may be used during the data interval of the same packet. It is desired to have a signal strength estimation for use in an OFDM system which relies on parameters which can be established during the preamble interval.

A technique for synchronization based on a training sequence consisting of repeating patterns is described in "Robust Frequency and Timing Synchronization for OFDM", IEEE Transactions on communications, December 1997. As noted in FIG. 3 and FIG. 4, due to the repeating preamble symbols, a correlation peak is observed at the end of the training sequence. This peak is used to detect a valid reception. The position of the peak also indicates the symbol boundary.

The correlation be represented as, $$C(n) = \sum_{n-L < k \leq n} X(k) * X(k-L)^*$$

The signal energy is computed as, $$E(n) = \frac{1}{2} \sum_{n-2L < k \leq n} |X(k)|^2$$

The normalized value used for symbol timing is given by $$Y(n) = \frac{|C(n)|^2}{E(n)^2}$$

U.S. Pat. No. 5,214,675 by Mueller et al. describes a system for compensating for multi-path reflection in a communications system by computing a variance of the signal and providing this signal to a filter which compensates for multi-path delay.

U.S. Pat. No. 6,792,055 by Hart describes a system for use in QAM whereby the strength of the demodulated signal is fed back to a gain control. In another embodiment, the decoder makes hard and soft decisions according to a variable threshold which is set by the strength of the signal applied to the decoder.

U.S. Pat. No. 5,740,203 describes a prior art demapper for QAM and PSK modulation methods which performs the function of block 24 of FIG. 1 or block 140 of FIG. 6.

U.S. Pat. No. 5,379,324 by Mueller et al describes a system for computing gain and noise variance of a channel for use in correcting the channel.

OBJECTS OF THE INVENTION

A first object of the invention is to generate an estimate of SINR using signals from a prior art symbol detection function.

A second object of the invention is to generate an estimate of SINR from a preamble symbol stream.

A third object of the invention is to generate an estimate of SINR from a preamble stream, a delayed preample stream, a conjugator, and two multipliers.

SUMMARY OF THE INVENTION

An estimate of noise is given by $V(n)=(E(n)-C(n))/L$, measured when the ratio of $En^2/Cn^2$ is at a maximum during a packet interval, where $E(n)$ is derived from the incoming symbol stream 92 $X_k$ where a delay element 62 with a delay interval L equal to a preamble interval generates a delayed incoming stream which is multiplies the incoming symbol stream 92 $X_k$ with the delayed and conjugated copy 65 of the symbol stream to generate a first multiplier 66 output 67 $X(k)*X(k-L)*$. A second multiplier 68 generates an output 69 $X(k)*X(k)$ from the product of the delayed symbol stream 63 multiplied by a conjugated copy of the delayed symbol stream 65. The complex outputs of the first multiplier 66 are summed over a preamble interval L in accumulator 70, the output of which is fed to phase finder 152 which generates magnitude 156. The magnitude 156 is scaled by the accumulator interval L by scaler 512, and this result is subtracted from the second multiplier 68 output 69 summed 72 over two preamble intervals (2L) and scaled by 2L, thereby generating an estimate of noise level 162. Qualifier 166 generates signal 168, which indicates when noise estimate 162 is valid, which is optionally at the time when the ratio of $En^2/Cn^2$ is at a maximum.

As discussed earlier, the frequency-offset estimate is computed from the angle of the correlation output $\angle C(n)$ at the peak of $Y(n)$.

BRIEF DESCRIPTION OF THE DRAWINGS

FIG. 4 shows the waveforms of the prior art system of FIG. 3.

FIGS. 5b and 5c show the accumulators of FIG. 5a.

DETAILED DESCRIPTION OF THE INVENTION

Figure 1:
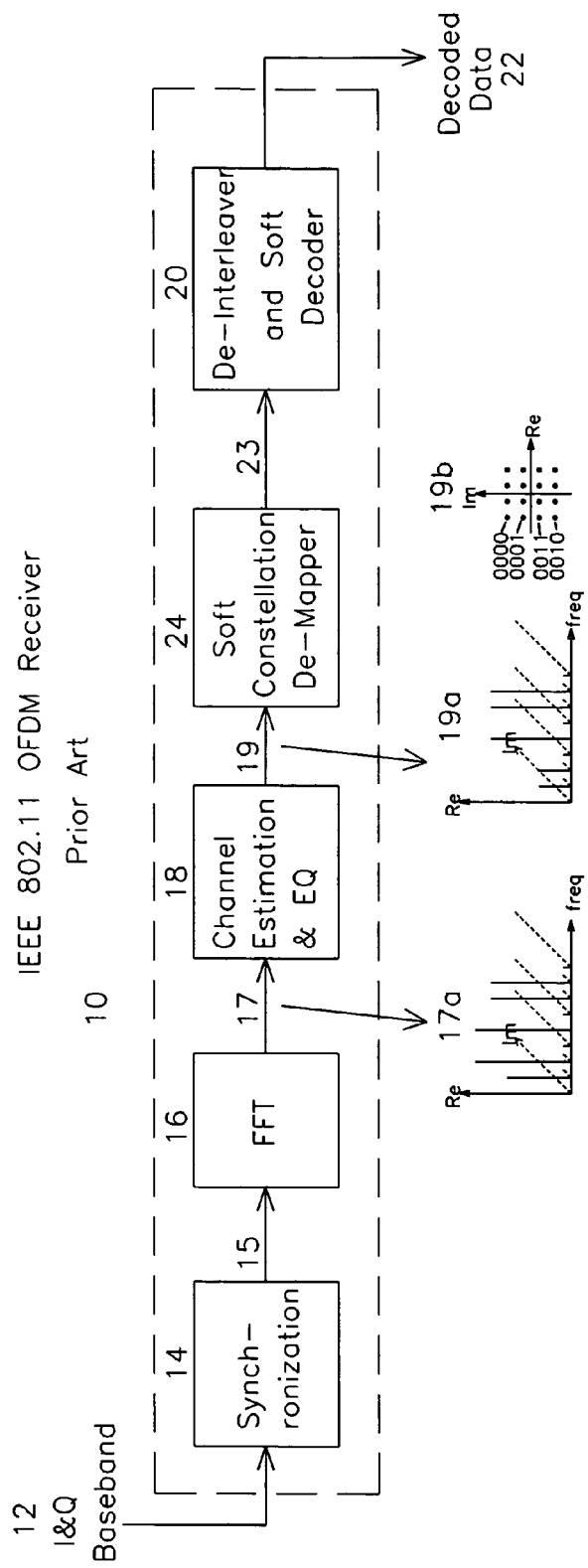
FIG. 1 shows the block diagram for a prior art 802.11 OFDM receiver.
Figure 2:
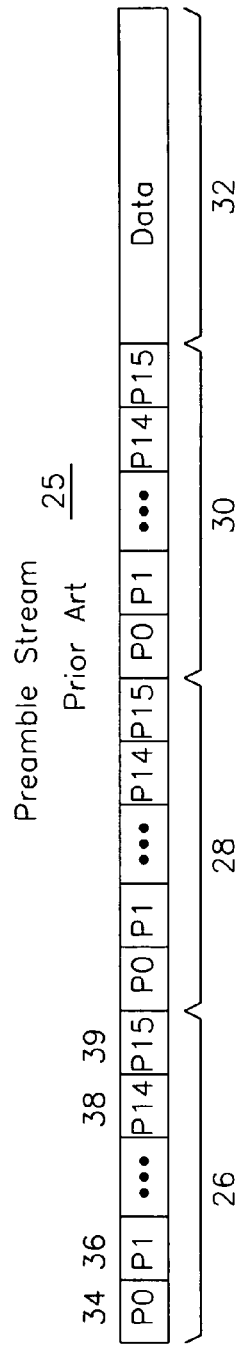
FIG. 2 shows a stream of preamble symbols.
Figure 3:
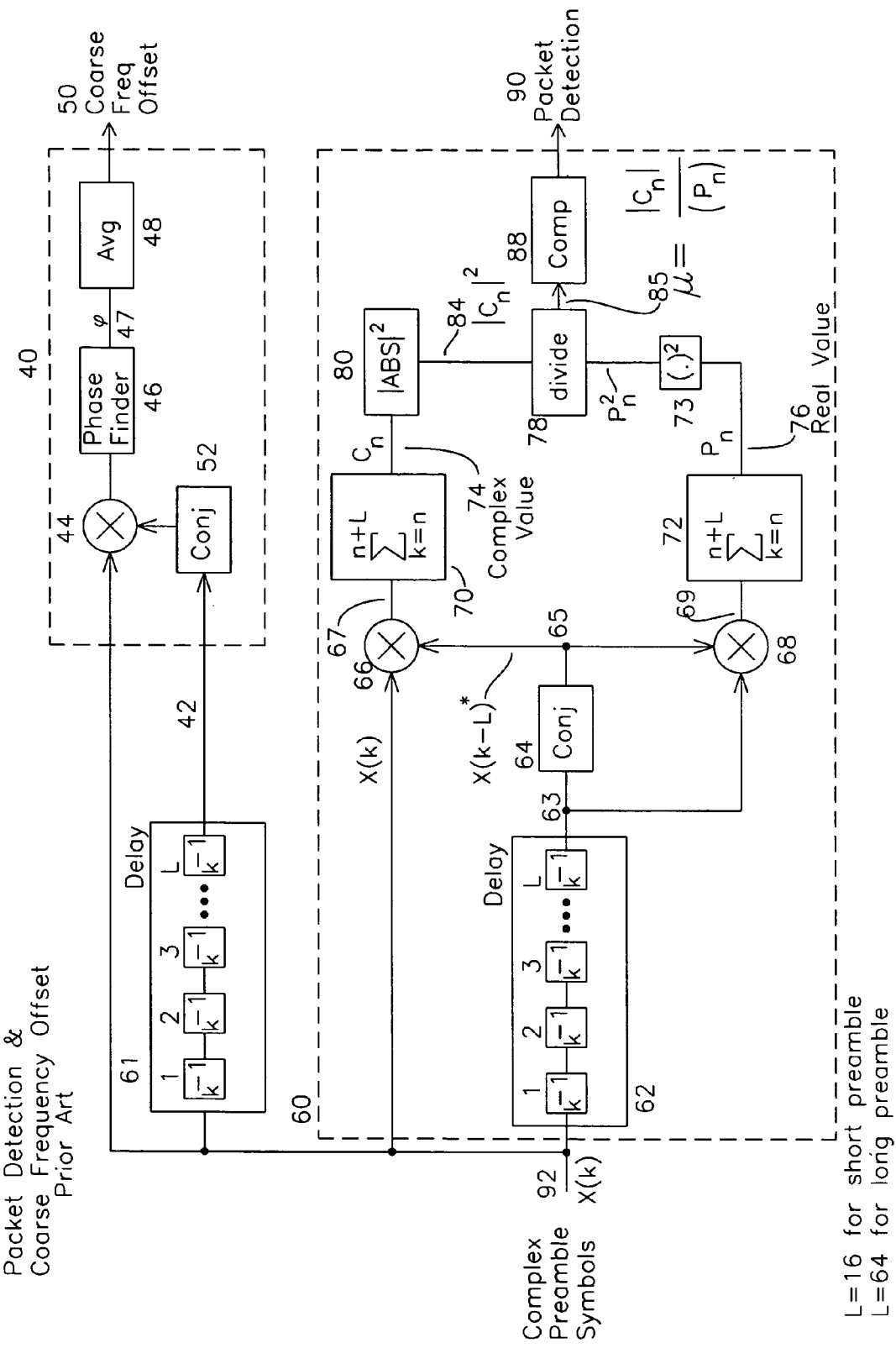
FIG. 3 shows the block diagram for a prior art packet detection and frequency offset subsystem.
Figure 5A:
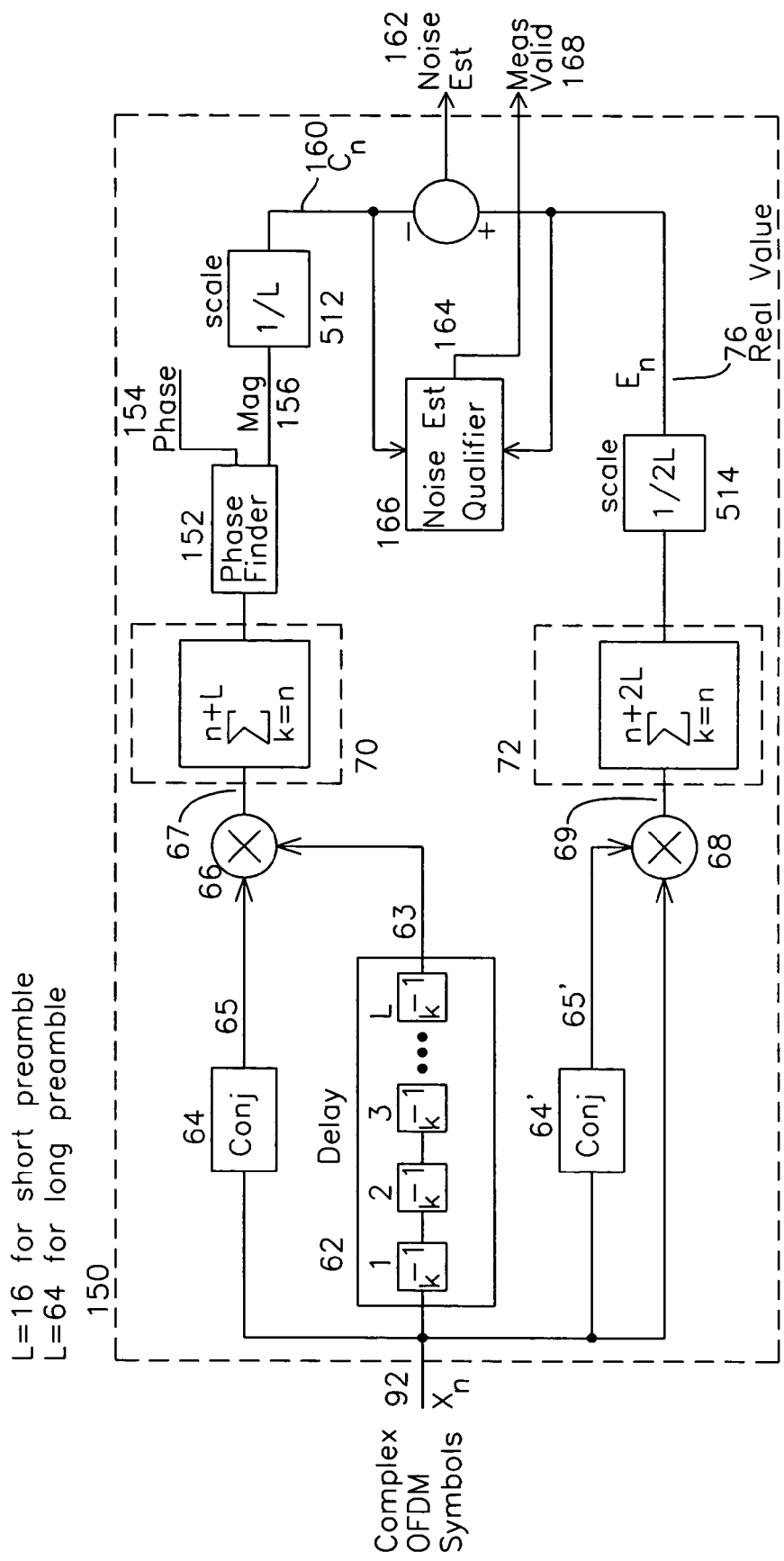
FIG. 5a shows the block diagram for an OFDM noise estimator.

FIG. 5a shows a block diagram for the present noise estimator 150, which may be used as the synchronization function such as 14 of FIG. 1. The synchronization technique shown in FIG. 5a yields a signal quality estimate in the form of noise measurement 162 in conjunction with qualifier signal 168. The reference numbers of FIG. 5a perform similar functions as shown in FIG. 3. As was described earlier, incoming preamble stream 92 is conjugated 64' to generate a conjugated output 65' which is multiplied by second multiplier 68 to second multiplier output 69, which is summed 72 over two preamble intervals 2L and scaled by 2L 514 to form real valued En 76. The input signal 92 is simultaneously delayed 62 by preamble length L and multiplied by conjugated 64 multiplied by the input stream 92 using first multiplier 66 to generate output 67 as before, which is accumulated over a preamble interval L in accumulator 70, the output of which is fed to the phase finder CORDIC 152 which provides a phase output 154 as well as a magnitude output 156, which is scaled by preamble interval L to produce Cn 160. As is clear from FIG. 5a, conjugation operation 64 and conjugation operation 64' are operating on the same symbol stream 92 and performing the same conjugation operation to generate output 65 or 65'. Therefore, it is possible to use a single conjugator coupled to the input stream 92 to feed first multiplier 66 and second multiplier 68 with the result of a single conjugator operation such as one of the outputs 65 or 65'. An estimate of the noise level 162 can be obtained by subtracting the magnitude of the correlation output |C(n)| 160 from the signal energy E(n) 76 when Y(n) reaches its peak value. In the prior art of FIG. 3, deriving the magnitude of C(n) from C(n)² 84 would require a square root computation. However, in FIG. 5, the CORDIC processor 152 that is used to compute the angle 154 of C(n) for the frequency offset estimation of FIG. 3 can also compute the magnitude of C(n) 156. The CORDIC processor 152, as known in the prior art, accepts a real and imaginary component as input 67 (a+jb), and generates a phase output 154 corresponding to $\tan^{-1}(b/a)$ and a magnitude output corresponding to $\sqrt{a^2+b^2}$. In this manner, a noise estimate V(n) 162 for the incoming signal 92 can be generated by subtracting the correlated signal level 160 from the noise plus interference output 76. Qualifier 166 generates signal 168, which indicates when noise estimate 162 is valid, which is optionally at the time when the ratio of En²/Cn² is at a maximum. An AGC function in the RF processing is performed prior to processor 130, and results in increasing the receiver gain when the incoming signal level is weak, and decreasing the receiver gain when the incoming signal level is strong, thereby optimizing the use of the digitization dynamic range. The AGC function generates a relatively constant En level 76, which results in an improved noise estimate 162. It is also possible to scale the noise estimate 162 by the length of the preamble, shown as L=16 for a short preamble, and L=32 for a long preamble. Generally, a longer sample size produces more accurate estimates of noise variance. In this manner, an improved estimator for noise level for use in a communications receiver is described.

Figure 5B:
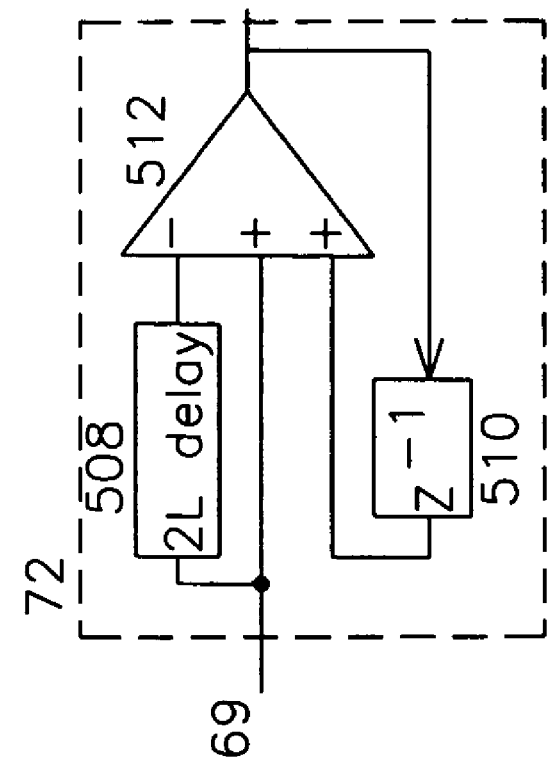

FIG. 5b shows an embodiment for accumulator 70, which takes an input 67 and sums 504 the input 67 with a one-sample delayed output 506 and subtracts out an L delayed 502 version of the input 67. In this manner, the output of the first accumulator represents the sum of the previous L samples.

Figure 5C:
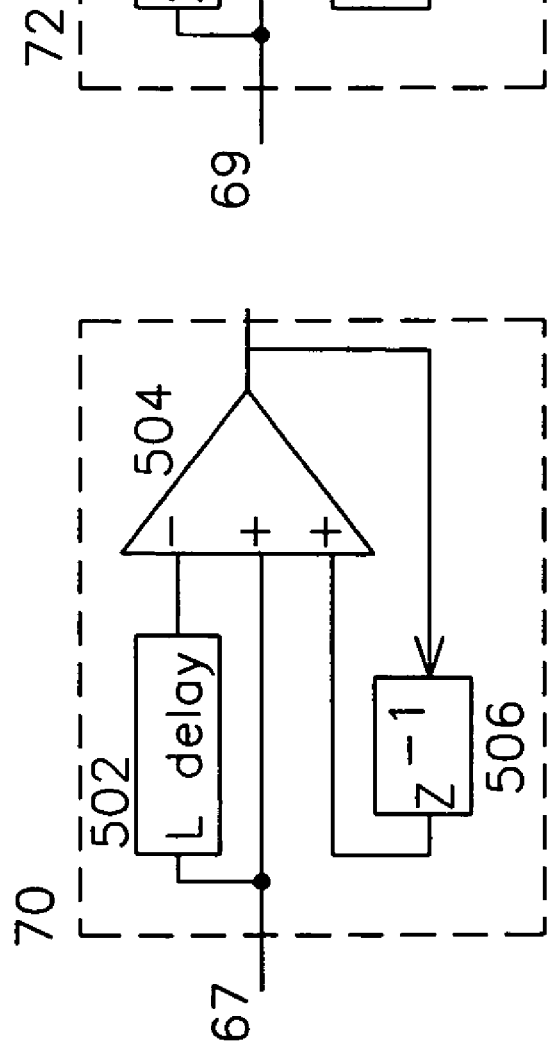

FIG. 5c similarly shows an embodiment for the accumulator 72, which receives an input 69 and sums 512 the input 69 with a one-sample delayed output 510 and subtracts out a 2L delayed 508 version of the input 69. In this manner, the output of the second accumulator represents the sum of the previous 2L samples.

We claim:

1. An estimator of Signal to Noise and Interference Ratio (SINR), said estimator receiving a symbol stream which includes at least two preambles, each said preamble comprising a plurality L of symbols and occupying a first time interval, said estimator having:
a delay element coupled to said symbol stream and producing an output from said symbol stream which is delayed substantially equal to said first time interval;
a conjugator coupled to said symbol stream and producing a conjugated output;
a first multiplier forming a product from said conjugated output and said delayed symbol stream, said first multiplier coupled to a first accumulator operating over said first time interval, thereafter coupled to a phase finder for generating a magnitude which may be scaled by the number of samples in said first time interval, thereby forming a value Cn;
a second multiplier forming a product from said symbol stream and said conjugated output, said second multiplier coupled to a second accumulator for summing previous 2L samples, thereafter scaling the result by 2L to form a value En;
forming a noise estimate by subtracting said value Cn from said value En.

2. The estimator of claim 1 where said preamble has 16 said symbols.

3. The estimator of claim 1 where said L=16.

4. The estimator of claim 1 where said conjugator accepts a real and imaginary input and forms said conjugator output by presenting said real input with an inverted said imaginary input.

5. The estimator of claim 1 where said first accumulator operates over previous 16 values.

6. The estimator of claim 1 where said second accumulator operates over previous 32 values.

7. The estimator of claim 1 where a noise estimate is made when $E_n^2/C_n^2$ is at a maximum.

8. The estimator of claim 1 where said noise estimate is accompanied by a validity output which is active when En²/Cn² is a maximum.

9. The estimator of claim 8 where subtraction operation is a comparison of said $C_n$ and said $E_n$ in which said comparison results in a 8 bit value.

10. The estimator of claim 1 where said first accumulator comprises a summer which generates said accumulator output by summing a current input value, a previous input value, and subtracting the value of said L previous input value.

11. The estimator of claim 1 where said second accumulator comprises a summer which generates said accumulator output by summing a current input value, a previous input value, and subtracting the value of said 2L previous input value.

12. A process for estimating a Signal to Noise and Interference Ratio (SINR), the estimation process receiving a symbol stream which includes at least two preambles, each said Preamble comprising a plurality L of symbols and occupying a first time intervals said estimation process having:
a delay element coupled to said symbol stream and producing an output from said symbol stream which is delayed substantially equal to said first time interval;
a conjugator coupled to said symbol stream and producing a conjugated output;
a first multiplier forming a product from said conjugated output and said delay element output, said first multiplier coupled to a first accumulator operating over said first time interval, thereafter coupled to a phase finder for generating the magnitude of said accumulator output which is thereafter scaled by said L in said first time interval to form a value Cn;
a second multiplier forming a product from said symbol stream and the conjugate of said symbol stream, said second multiplier output coupled to a second accumulator summing previous 2L values, thereafter scaling by 2L to form a value En;
whereby said process forms a noise estimate by subtracting said value Cn from said value En.

13. The process of claim 12 where said preamble has 16 said symbols.

14. The process of claim 12 where said L=16.

15. The process of claim 12 where said conjugator accepts a real and imaginary input and forms said conjugator output by presenting said real input with an inverted said imaginary input.

16. The process of claim 12 where said first accumulator operates over previous 16 values.

17. The process of claim 12 where said second accumulator operates over previous 32 values.

18. The process of claim 12 where said noise estimate is made when $E_n^2/C_n^2$ is at a maximum.

19. The process of claim 12 where said noise estimate is accompanied by a validity output which is active when $E n^2/C n^2$ is a maximum.

20. The process of claim 19 where subtraction operation is a comparison of said $C_n$ and said $E_n$ in which said comparison results in a 8 bit value.

21. The estimator of claim 12 where said first accumulator comprises a summer which generates said accumulator output by summing a current input value, a previous input value, and subtracting the value of said L previous input value.

22. The estimator of claim 12 where said second accumulator comprises a summer which generates said accumulator output by summing a current input value, a previous input value, and subtracting the value of said 2L previous input value.

* * * * *